United States Patent
Zalstein et al.

(10) Patent No.: US 12,430,210 B2
(45) Date of Patent: Sep. 30, 2025

(54) MANAGING CHANGES TO METADATA IN A DATA STORAGE SYSTEM

(71) Applicant: Dell Products L.P., Round Rock, TX (US)

(72) Inventors: Dror Zalstein, Givatayim (IL); Vladimir Shveidel, Pardes-Hana (IL); Jenny Derzhavetz, Raanana (IL)

(73) Assignee: Dell Products L.P., Round Rock, TX (US)

( * ) Notice: Subject to any disclaimer, the term of this patent is extended or adjusted under 35 U.S.C. 154(b) by 128 days.

(21) Appl. No.: 18/188,568

(22) Filed: Mar. 23, 2023

(65) Prior Publication Data
US 2024/0320098 A1    Sep. 26, 2024

(51) Int. Cl.
*G06F 11/14* (2006.01)
*G06F 11/07* (2006.01)
*G06F 11/20* (2006.01)

(52) U.S. Cl.
CPC ...... *G06F 11/1435* (2013.01); *G06F 11/0793* (2013.01); *G06F 11/2056* (2013.01)

(58) Field of Classification Search
CPC .. G06F 11/14; G06F 11/1435; G06F 11/0793; G06F 11/2056
See application file for complete search history.

(56) References Cited

U.S. PATENT DOCUMENTS

| | | | |
|---|---|---|---|
| 9,268,689 B1* | 2/2016 | Chen | G06F 21/53 |
| 10,089,338 B2* | 10/2018 | Ji | G06F 16/289 |
| 10,417,213 B1* | 9/2019 | Mukku | G06F 3/0659 |
| 11,182,372 B1 | 11/2021 | Jain et al. | |
| 11,301,330 B2* | 4/2022 | Shveidel | G06F 11/1471 |
| 11,550,672 B1* | 1/2023 | Kurian | G06F 11/202 |
| 2016/0110249 A1* | 4/2016 | Orme | G06F 11/1048 714/6.24 |
| 2017/0091299 A1* | 3/2017 | Ngan | G06F 11/2076 |
| 2018/0356964 A1* | 12/2018 | Morris | G06F 3/011 |
| 2020/0241969 A1* | 7/2020 | Shveidel | G06F 11/1451 |
| 2024/0232020 A1* | 7/2024 | Shveidel | G06F 16/1844 |
| 2024/0320098 A1* | 9/2024 | Zalstein | G06F 11/2056 |

* cited by examiner

*Primary Examiner* — Kamini B Patel
(74) *Attorney, Agent, or Firm* — BainwoodHuang (57) ABSTRACT

A searchable metadata change log is maintained in a persistent memory of a data storage system, and stores metadata changes to be aggregated and applied to data storage system metadata located in non-volatile data storage. New metadata changes are added to the metadata change log by storing the new metadata changes into the persistent memory, storing structural modifications to the metadata change log needed to add the new metadata changes to the metadata change log into a transaction entry located in the persistent memory, and processing the resulting transaction entry to perform the structural modifications to the metadata change log that were stored in the transaction entry.

13 Claims, 5 Drawing Sheets

Fig. 1

TRANSACTION ENTRY 200

{

Num_of_modified_MCL_mempool_offsets = N — TOTAL STRUCTURAL MODIFICATIONS 202

MCL_mempool_offset1 = new_metadata1
MCL_mempool_offset2 = new_metadata2
...
MCL_mempool_offsetN = new_metadataN

} — STRUCTURAL MODIFICATIONS 204

MANAGING CHANGES TO METADATA IN A DATA STORAGE SYSTEM

TECHNICAL FIELD

The present disclosure relates generally to data storage systems, and more specifically to technology for managing changes to data storage system metadata, that efficiently supports failure recovery and provides aggregation of metadata changes.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

Data storage systems generate and use many types of metadata. Examples of data storage system metadata include metadata that describes how host data is organized and stored in the data storage system, and/or how the host data stored by the data storage system is retrieved so that it can be returned to a host. Metadata changes are new values for data storage system metadata objects, and may be generated during operation of the data storage system as a result of processing host I/O operations that store and/or access the host data stored by the data storage system, and/or as a result of the data storage system performing internal operations to improve resource utilization, efficiency, performance, etc., of the data storage system. Metadata generated and used by the data storage system is stored in the non-volatile data storage devices of the data storage system.

SUMMARY

In the disclosed technology, a metadata change log is maintained in a persistent memory of a data storage system. The metadata change log is searchable, and stores metadata changes that are to be applied to the metadata generated by the data storage system that is stored in the non-volatile data storage devices of the data storage system. New metadata changes are added to the metadata change log by storing the new metadata changes into the persistent memory, and then storing structural modifications to the metadata change log that are needed to add the new metadata changes to the metadata change log into a transaction entry that is also located in the persistent memory. The disclosed technology processes the resulting transaction entry to perform the structural modifications to the metadata change log stored in the transaction entry.

In some embodiments, storing the structural modifications into the transaction entry includes storing, for each one of the structural modifications to the metadata change log, an offset of a structural element that is modified by the structural medication, e.g. an offset relative to a starting address of a portion of the persistent memory from which the metadata change log is allocated. To perform the structural modification, the structural element is modified when the transaction entry is processed.

In some embodiments, storing the structural modifications into the transaction entry further includes storing, for each one of the structural modifications, a pointer to a respective one of the new metadata changes in the persistent memory. The structural element for the structural modification is replaced by the pointer when the transaction entry is processed.

In some embodiments, the structural elements of the metadata change log that are replaced by the pointers to the new metadata changes, when the transaction entry is processed, are null pointers.

In some embodiments, the transaction entry is processed atomically, such that successful processing of the transaction entry is indicated only in response to all of the structural modifications to the metadata change log that are stored in the transaction entry having been successfully performed.

In some embodiments, the transaction entry is one of multiple transaction entries stored in the persistent memory. Recovery from a failure event during which the contents of a volatile memory of the data storage system was lost may include, for each one of the plurality of transaction entries, determining whether the transaction entry is valid. In response to determining that the transaction entry is valid, a determination is made as to whether processing of the transaction entry was interrupted by the failure event. In response to determining that processing of the transaction entry was interrupted by the failure event, the recovery further from the failure event includes completing processing of the transaction entry.

In some embodiments, the persistent memory is battery backed in order to prevent the loss of the contents of the persistent memory during failure events that cause the contents of the volatile memory of the data storage system to be lost.

In some embodiments, the persistent memory is located in a first storage processor of the data storage system, and the contents of the persistent memory is mirrored to another persistent memory that may be located in a second storage processor of the data storage system.

In some embodiments, the non-volatile data storage devices of the data storage system include at least one solid state drive.

The disclosed technology is integral to a practical technical solution of providing high availability and efficient failure recovery in a data storage system. In the disclosed technology, storage of the metadata change log in persistent memory, and the use of the disclosed transaction entries to add new metadata changes to the metadata change log, efficiently supports recovery by the data storage system after a data storage system failure. Because the metadata change log itself is stored in persistent memory, the failure recovery need only be performed for metadata changes that were in the process of being added to the metadata change log at the time of the failure. The disclosed transaction entries also stored in the persistent memory, and the fact that the disclosed technology only adds metadata changes to the metadata change log supports an efficient determination of whether any updates to the metadata change log were interrupted by a failure, as well as the completion of any identified interrupted updates. The amount of persistent memory required to store the transaction entries reflects a desired total number of transaction entries, and may be configurable. The total number of transaction entries used may be configured according to a total amount of parallelism desired for processing transaction entries before and/or after a failure event, and/or according to a total amount of the persistent memory resourced that is desired and/or available to be allocated for storing transaction entries.

In other solutions, operating without the disclosed technology, a metadata change log or the like may instead be stored in volatile memory. In such other solutions, the entire metadata change log may have to be re-constructed following a data storage system failure. Support for the reconstruction of an entire metadata change log in such other solutions may include duplicating the contents of the metadata change log in persistent memory, e.g. by storing a journal, log, or other data structures that store all of operations that must be replayed in order to reconstruct the entire metadata change log after the failure. The amount of persistent memory used by such other solutions to store what are effectively duplicated metadata changes is essentially twice the size of the metadata change log, and is much greater than the amount of persistent memory required by the disclosed technology to store a metadata change log and transaction entries. Because persistent memory is typically a relatively expensive resource, the disclosed technology advantageously provides a significantly less expensive solution.

The metadata change log of the disclosed technology also provides aggregation of metadata changes over a period of time. Aggregation of metadata changes using the metadata change log, prior to applying the aggregated changes to the metadata stored in the non-volatile data storage, advantageously reduces write amplification. Since the non-volatile data storage of a data storage system is typically made up of solid state drives, the reduced write amplification also provided by the disclosed system results in an increased drive life, and better write performance, with regard to the to the non-volatile data storage of the data storage system.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Embodiments will now be described with reference to the figures. The embodiments described herein are provided only as examples, in order to illustrate various features and principles of the disclosed technology, and are not limiting. The embodiments of disclosed technology described herein are integrated into a practical solution for updating a metadata change log in a data storage system that advantageously provides high availability and failure recovery in an efficient manner.

In the disclosed technology, a metadata change log is maintained in a persistent memory of a data storage system. The persistent memory may be battery backed in order to prevent loss of its contents during failure events that cause the contents of volatile memory of the data storage system to be lost. The persistent memory may be located in a storage processor of the data storage system, and the contents of the persistent memory may be mirrored to another persistent memory that is located in another storage processor of the data storage system.

The metadata change log stores metadata changes that are to be applied to metadata that is stored in non-volatile data storage devices of the data storage system. The non-volatile data storage devices of the data storage system may include at least one solid state drive. The metadata change log is searchable within the data storage system, such that that multiple, aggregated metadata changes that are logically related may be retrieved simultaneously from the metadata change log and applied together to metadata stored in the non-volatile data storage of the data storage system, in order to reduce write amplification. New metadata changes are added to the metadata change log by storing new metadata changes into the persistent memory, and then storing structural modifications to the metadata change log that are needed to add respective ones of the new metadata changes to the metadata change log into a transaction entry that is also located in the persistent memory. The transaction entry is subsequently processed to perform all the structural modifications to the metadata change log that are stored in the transaction entry.

Storing the structural modifications into the transaction entry may include storing, for each one of the structural modifications, an offset of a structural element within the metadata change log, e.g. an offset of the structural element relative to a starting address of a portion of the persistent memory from which the metadata change log is allocated. When the transaction entry is subsequently processed, the structural element in the metadata change log is modified, thus performing the structural modification to the metadata change log that is needed to add the respective one of the new metadata changes to the metadata change log.

Storing the structural modifications into the transaction entry may further include storing, into the transaction entry for each one of the structural modifications, a pointer to a respective one of the new metadata changes within the persistent memory. The structural element for the structural modification is then replaced by the pointer when the transaction entry is subsequently processed. The structural elements of the metadata change log that are replaced by pointers to the new metadata changes, when the transaction entry is processed, may be nodes containing null pointers within the metadata change log.

Each transaction entry is processed atomically, such that successful processing of a given transaction entry is indicated only in response to successful performance of all structural modifications to the metadata change log that are stored within that transaction entry, thereby adding all the new metadata changes corresponding to that transaction entry to the metadata change log.

Multiple transaction entries may be stored in the persistent memory. The total number of transaction entries for a given deployment or configuration may be configured according to a total amount of parallelism that is desired for processing transaction entries before and/or after a failure, and/or according to a total amount of persistent memory that is desired to be allocated for storing transaction entries.

Recovery of the data storage system from a failure event during which the contents of a volatile memory of the data storage system was lost may include, for each one of the plurality of transaction entries, determining whether the transaction entry is valid, e.g. by checking a checksum or the like associated with the transaction entry. In response to determining that the transaction entry is valid, a determination is made as to whether processing of the transaction entry was interrupted by the failure event. In response to determining that processing of a transaction entry was interrupted by the failure event, the recovery process includes completing the processing of that transaction entry.

Figure 1:
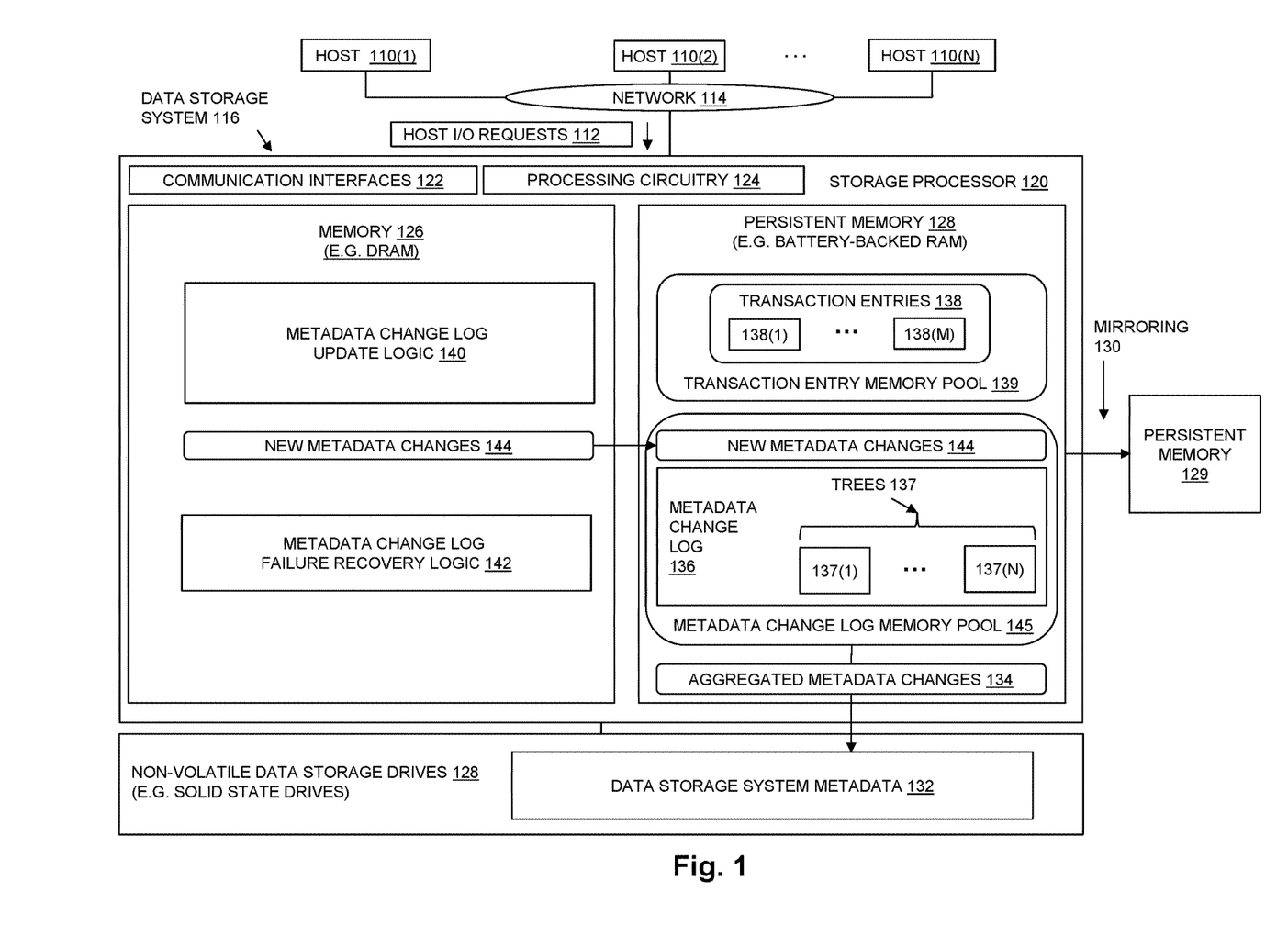
FIG. 1 is a block diagram showing an example of a data storage system including an illustrative embodiment of the disclosed technology.

FIG. 1 is a block diagram showing an operational environment for the disclosed technology, including an example of a Data Storage System 116 in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon issue Host I/O Requests 112 (e.g. host I/O read requests and host I/O write requests) that access non-volatile data storage provided by Data Storage System 116. For example, Host I/O Requests 112 are issued by the hosts to Data Storage System 116 over one or more networks, such as a local area network (LAN), and/or a wide area network (WAN) such as the Internet, etc., and shown for purposes of illustration in FIG. 1 by Network 114. Alternatively, or in addition, one or more of Hosts 110(1) and/or applications consuming non-volatile data storage provided by Data Storage System 116 may execute within Data Storage System 116.

Data Storage System 116 includes at least one storage processor, shown by Storage Processor 120. Storage Processor 120 is communicably coupled to both Network 114 and physical Non-Volatile Data Storage Drives 128, e.g. at least in part though one or more Communication Interfaces 122. No particular hardware configuration is required, and Storage Processor 120 may be embodied as any specific type of device that is capable of i) processing host input/output (I/O) requests (e.g. I/O read and I/O write requests, etc.), and ii) persistently storing host data.

The Non-Volatile Data Storage Drives 128 may include physical data storage drives such as solid state drives, magnetic disk drives, hybrid drives, optical drives, and/or other specific types of drives. In some embodiments, Physical Non-Volatile Data Storage Drives 128 may consist of or include a disk array enclosure or the like.

A Memory 126 in Storage Processor 120 stores program code that is executed on Processing Circuitry 124, as well as data generated and/or processed by such program code. Memory 126 may consist of volatile memory, e.g. DRAM (Dynamic Random-Access Memory).

Memory 126 is communicably coupled to a persistent memory (PMEM), shown by Persistent Memory 128. Persistent Memory 128 is used by program code executing in Memory 126, in order to store certain data, including data storage system metadata and/or other data, data structures, etc., that may be generated and/or accessed by Metadata Change Log Update Logic 140, Metadata Change Log Failure Recovery Logic 142, and/or other program code executing in the Storage Processor 120. The contents of Persistent Memory 128 are not lost when power is turned off to the Storage Processor 120, as may occur suddenly and unexpectedly when Storage Processor 120 experiences a failure event. For example, Persistent Memory 128 may consist of or include battery-backed RAM (Random Access Memory).

In some embodiments, the contents Persistent Memory 128 may be mirrored by Storage Processor 120 to another persistent memory that is located in another storage processor of the Data Storage System 116. For example, in FIG. 1, the contents of Persistent Memory 128 are mirrored (e.g. by Mirroring 130) to Persistent Memory 129, which may be another battery-backed RAM located in another storage processor of the Data Storage System 116.

Processing Circuitry 124 may include or consist of one or more processor cores ("processors"), e.g. within one or more multi-core processor packages. Each processor core may include or consist of a processing unit, made up of electronic circuitry that is capable of executing instructions.

Processing Circuitry 124, Memory 126, and Persistent Memory 128 together form electronic control circuitry that is configured and arranged to carry out various methods and functions described herein. The Memory 126 stores a variety of software components that may be provided in the form of executable program code. For example, Memory 126 may include software components including Metadata Change Log Update Logic 140 and Metadata Change Log Failure Recovery Logic 142. When instructions of the program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

During operation of the components shown in FIG. 1, Storage Processor 120 generates and uses data storage system metadata. The data storage system metadata includes metadata that describes how host data indicated by Host I/O Requests 112 is organized and stored by Storage Processor 120 in the Non-Volatile Data Storage Drives 128, and/or how the host data stored in stored in the Non-Volatile Data Storage Drives 128 can be retrieved by Storage Processor 120 so that it can be returned to a host. Metadata changes occur as a result of Storage Processor 120 processing Host I/O Requests 112, and/or as a result of Storage Processor 120 performing internal operations to improve resource utilization, efficiency, performance, etc. Metadata generated and used by Storage Processor 120 is stored in Non-Volatile Data Storage Drives 128, and is shown by Data Storage System Metadata 132.

In some embodiments, sets of logically related metadata may be stored together in individual pages of metadata. Each page of metadata in Data Storage System Metadata 132 may correspond to and be accessed using a metadata page index, referred to as a logical index "LI".

For example, in some embodiments, host data may be stored by Storage Processor 120 in logical volumes allocated by Storage Processor 120 within the Non-Volatile Data Storage Drives 128. Metadata related to each individual logical volume of host data may be stored within a corresponding one of multiples pages of metadata within Data Storage System Metadata 132. Changes to metadata located within the same individual page of metadata are considered logically related metadata changes.

One example of data storage system metadata that may be stored in a page of metadata in Data Storage System Metadata 132 is a data structure sometimes referred to as a "mapper tree" for the corresponding logical volume of host data. Storage Processor 120 uses the mapper tree to represent mappings between specific logical block addresses (LBAs) within a logical address space of the logical volume and corresponding physical pages of non-volatile data storage that are used to store host data written to those LBAs. Processing of host I/O requests directed to a logical volume may include traversals of the logical volume's mapper tree in order to identify the physical pages of non-volatile storage that correspond to the LBAs within the logical address space of the logical volume indicated by each host I/O request. In some embodiments, each mapper tree consists of or includes a tree structure having multiple levels of mapper tree nodes, including upper levels 1, 2, etc., a leaf level under the upper levels, a virtual block layer under the leaf level, and a physical block layer under the virtual block layer. Each mapper tree leaf node maps a corresponding segment within the logical address space of the logical volume (e.g. a range of LBAs) to pointers in virtual blocks in a virtual block layer. The pointers in the virtual blocks of the virtual block layer point to individual physical pages of non-volatile data storage that are indicated by or contained within corresponding physical blocks of non-volatile data storage located in the physical block layer of the mapper tree.

Mapper trees are one example of data storage system metadata that may be stored in Data Storage System Metadata 132, but the disclosed technology is not limited to use with mapper tree metadata, and the disclosed technology may be used to maintain various other types of data storage system metadata.

Metadata Change Log 136 is initialized and subsequently maintained in Persistent Memory 128 by Metadata Change Log Update Logic 140 and/or other program code executing in Storage Processor 120. Metadata Change Log 136 is searchable by program code executing in the Storage Processor 120. Metadata Change Log 136 is maintained in Persistent Memory 128 by storing metadata changes into Metadata Change Log 136, such that multiple, logically related metadata changes that are generated over a period of time can later be quickly retrieved in order for aggregated metadata changes to be written together from the Metadata Change Log 136 to the Data Storage System Metadata 132 in the Non-Volatile Data Storage Drives 128 using a single write operation, as shown by Aggregated Metadata Changes 134. For example, Metadata Change Log Update Logic 140 may add multiple new metadata changes that are directed to an individual page of data storage system metadata to Metadata Change Log 136 as those metadata changes occur over a period of time. Metadata Change Log Update Logic 140 may then retrieve those metadata changes from Metadata Change Log 136, and then apply the multiple retrieved metadata changes to that page of Data Storage System Metadata 132 using a single write operation, e.g. when Metadata Change Log Update Logic 140 (or some other program logic executing in Storage Processor 120) flushes Aggregated Metadata Changes 134 from Storage Processor 120 to Data Storage System Metadata 132.

In addition to the metadata changes that it stores, Metadata Change Log 136 includes structural elements that organize the metadata changes for retrieval. For example, Metadata Change Log 136 may be a hash table of buckets, in which each bucket contains one of the Trees 137 (e.g. one of Trees 137(1) through 137(N)). For Storage Processor 120 to locate a specific metadata change within Metadata Change Log 136, a hash function is applied to the logical index (LI) of the page of metadata to which the metadata change applies. The output of the hash function identifies the one of the Trees 137 in which the metadata change is, or is to be, stored. The nodes within the Trees 137 are structural elements of the Metadata Change Log 136, and consist of, or contain, pointers. The pointers contained within the Trees 137 may be pointers to metadata changes, or may be null pointers. Each node within Trees 137 is only modified once, from a null pointer to a non-null value that is a pointer to a metadata change. The structural elements of Metadata Change Log 136 may be initialized and maintained by Metadata Change Log Update Logic 140 and/or other program logic such that Metadata Change Log 136 contains some number of null pointers following initialization of Metadata Change Log 136. Each one of the Trees 137 may be a binary tree, and nodes within each one of the Trees 137 (e.g. nodes containing non-null pointers) may be ordered based on the LIs of the pages of metadata affected by the metadata changes to which they point.

As illustrated in the example of FIG. 1, Metadata Change Log Update Logic 140 adds New Metadata Changes 144 to the Metadata Change Log 136. New Metadata Changes 144 may consist of or include one or more new portions of and/or new values to be written to existing portions of a mapper tree, and/or new values to be written to some other specific type of data storage system metadata. Metadata Change Log Update Logic 140 first stores New Metadata Changes 144 into Persistent Memory 128. For example, Metadata Change Log Update Logic 140 copies New Metadata Changes 144 from Memory 126 into a portion of Persistent Memory 128 from which Metadata Change Log 136 is allocated, e.g. into Metadata Change Log Memory Pool 145. Metadata Change Log Update Logic 140 then stores the structural modifications to Metadata Change Log 136 that are needed to add respective ones of the metadata changes within New Metadata Changes 144 to Metadata Change Log 136 into a transaction entry that is also located in the persistent memory, e.g. into one of the transaction entries 138(1) through 138(M) in Transaction Entries 138. Transaction Entries 138 are located in Transaction Entry Memory Pool 139. Transaction Entry Memory Pool 139 is a portion of Persistent Memory 128 from which transaction entries are allocated as they are used. The transaction entry storing the structural modifications to the Metadata Change Log 136 that are needed to add respective ones of the metadata changes within New Metadata Changes 144 to Metadata Change Log 136 is subsequently processed, e.g. by Metadata Change Log Update Logic 140. Processing of the transaction entry performs all the structural modifications to Metadata Change Log 136 that were stored in the transaction entry, thereby completing the addition of the New Metadata Changes 144 to Metadata Change Log 136 by linking New Metadata Changes 144 to Metadata Change Log 136.

In some embodiments, Metadata Change Log Update Logic 140 stores the structural modifications into the transaction entry at least in part by storing, for each one of the structural modifications, an offset of a structural element to be modified within the Metadata Change Log 136. For example, the offset of the structural element may be relative to a starting address of Metadata Change Log Memory Pool 145. Metadata Change Log Memory Pool 145 is a portion of Persistent Memory 128 from which Metadata Change Log 136 is allocated. When Metadata Change Log Update Logic 140 subsequently processes the transaction entry, Metadata Change Log Update Logic 140 uses the offsets stored in the transaction entry to locate the structural elements that are to be modified, and then modifies those structural elements individually in order to add respective ones of the metadata changes in New Metadata Changes 144 to Metadata Change Log 136.

In some embodiments, Metadata Change Log Update Logic 140 stores the structural modifications into a transaction entry at least in part by storing, into the transaction entry for each one of the structural modifications, a corresponding pointer to a respective one of the metadata changes in New Metadata Changes 144, the pointer indicating a location of that metadata change within Persistent Memory 128. When Metadata Change Log Update Logic 140 subsequently processes the transaction entry, Metadata Change Log Update Logic 140 replaces the structural element for each one of the structural modifications with the corresponding pointer. The structural elements of Metadata Change Log 136 that are replaced by pointers to individual ones of the metadata changes in New Metadata Changes 144 when the transaction entry is processed may, for example, be null pointers in nodes of the Metadata Change Log 136.

Metadata Change Log Update Logic 140 processes each individual transaction entry atomically, such that successful processing of a given transaction entry is indicated only in response to the Metadata Change Log Update Logic 140 successfully performing all structural modifications that are stored within that transaction entry, thereby adding all the new metadata changes corresponding to that transaction entry to Metadata Change Log 136.

As shown in FIG. 1, multiple transaction entries 138(1) through 138(M) may be allocated from and/or stored in the Transaction Entry Memory Pool 139 in Persistent Memory 128. A bitmap or the like may be used by Metadata Change Log Update Logic 140 to track usage (e.g. allocation and processing) of individual transaction entries. The total number M of transaction entries that are used in a given deployment or configuration may be configurable value, and may be set according to a total amount of parallelism that is desired for processing transaction entries before and/or after a failure, and/or according to a total amount of persistent memory that is desired to be allocated for storing transaction entries.

Recovery by the data storage system from a failure event, such as a failure event during which the contents of Memory 126 was unexpectedly lost, may be performed at least in part by Metadata Change Log Failure Recovery Logic 142. For example, failure recovery may include, for each one of the transaction entries 138(1) through 138(M) contained in the Transaction Entry Memory Pool 139, first determining whether the transaction entry is valid, e.g. by checking a checksum or the like that is contained in the transaction entry. Metadata Change Log Failure Recovery Logic 142 may then operate in response to each determination that an individual one of the Transaction Entries 138 is valid by determining whether processing of that transaction entry was interrupted by the failure event. Such a determination may, for example, be made by comparing the pointers in the transaction entry (i.e. the pointers indicating new metadata changes) to the values of the nodes of Metadata Change Log 136 at the corresponding offsets contained in the transaction entry.

In the case where the nodes in the Metadata Change Log 136 located at all the offsets contained in a valid transaction entry contain pointers that match the pointers corresponding to the offsets in the transaction entry, then Metadata Change Log Failure Recovery Logic 142 determines that processing of the transaction entry was completed successfully, and was not interrupted by the failure event. In such a case, Metadata Change Log Failure Recovery Logic 142 makes no modification to the Metadata Change Log 136, and proceeds to checking another one of the transaction entries.

In the case where a node in the Metadata Change Log 136 at an offset contained in a valid transaction entry contains a pointer that does not match the corresponding pointer in the transaction entry (e.g. in the case where the node at the offset in Metadata Change Log 136 still contains a null pointer), a determination is made that processing of the transaction entry was interrupted by the failure event. In such a case, Metadata Change Log Failure Recovery Logic 142 completes processing of the transaction entry by replacing the null pointer located at the offset within Metadata Change Log 136 with the pointer corresponding to the offset in the transaction entry.

Figure 2:
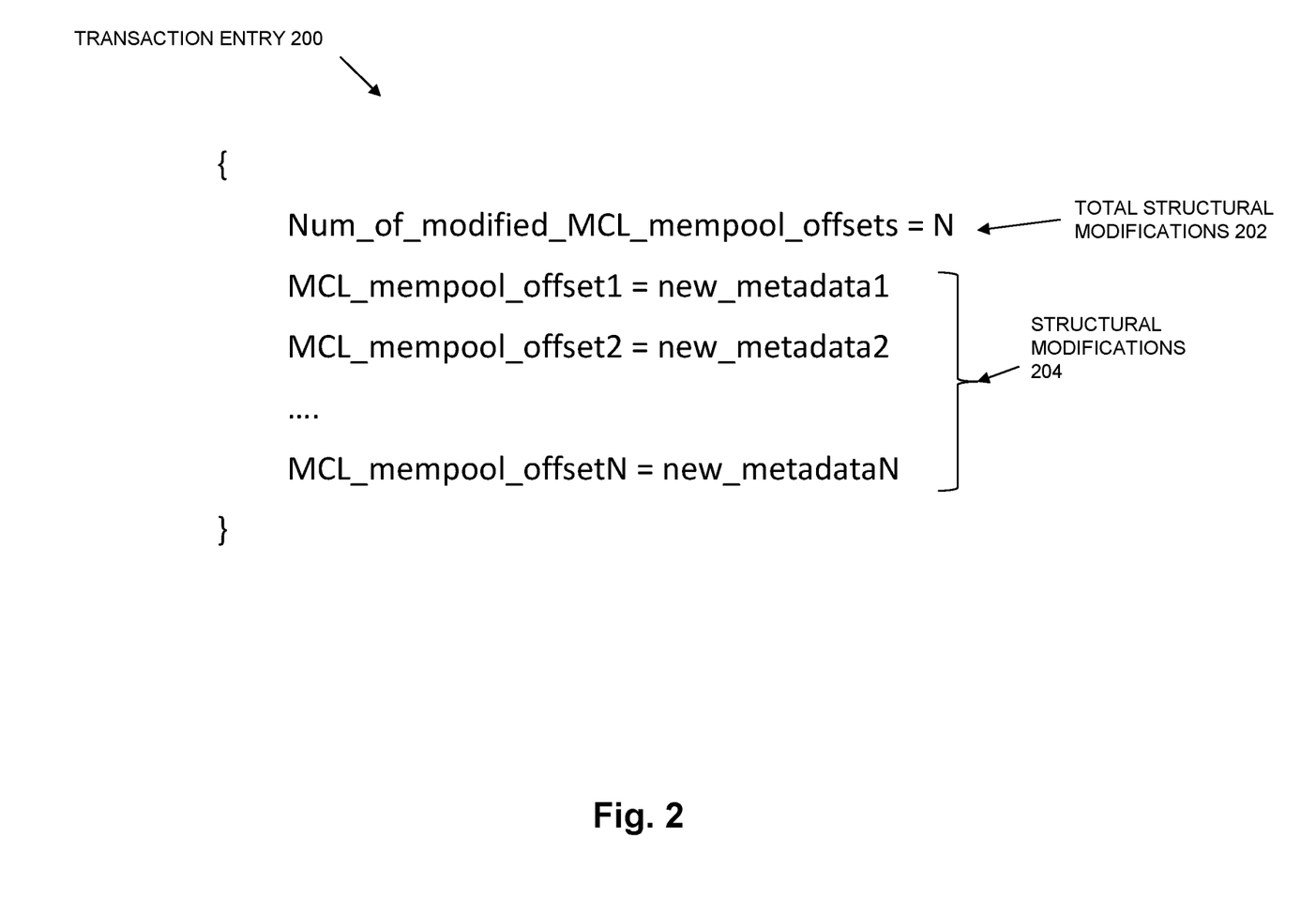
FIG. 2 is a block diagram showing an example of a transaction entry.

FIG. 2 shows an example contents of a Transaction Entry 200 in some embodiments. As shown in FIG. 2. Transaction Entry 200 includes a Total Structural Modifications 202 Num_of_modified_MCL_mempool_offsets indicating how many structural modifications are contained in the Transaction Entry 200. Transaction Entry 200 contains Structural Modifications 204. Each structural modification in Structural Modifications 204 includes an offset (e.g. an offset relative to a starting address of a metadata change log memory pool such as Metadata Change Log Memory Pool 145) of a structural element within the metadata change log, and a corresponding pointer to a respective one of the new metadata changes that are added to the metadata change log by processing of Transaction Entry 200 (e.g. the New Metadata Changes 144). Each pointer indicates a location within the persistent memory of one of the new metadata changes that is to be added to the metadata change log, and each offset is an offset of node in the metadata change log that currently stores a null pointer that is to be replaced by the corresponding pointer in Transaction Entry 200 when Transaction Entry 200 is processed. Each new metadata change may, for example, consist of or include a new value that is to be written to a specific item of data storage system metadata. For example, when Transaction Entry 200 is processed, a null pointer in a node located at MCL_mempool_offset1 is replaced by the pointer new_metadata1, a null pointer in a node located at MCL_mempool_offset1 is replaced by the pointer new_metadata1, a null pointer in a node located at MCL_mempool_offset2 is replaced by the pointer new_metadata2, and so on through the replacement of a null pointer in a node located at MCL_mempool_offsetN with the pointer new_metadataN. Transaction Entry 200 may also contain a checksum or the like that is computed for Transaction Entry 200 when generation of Transaction Entry 200 is completed, and then stored into Transaction Entry 200 prior to starting the processing of Transaction Entry 200.

Figure 3:
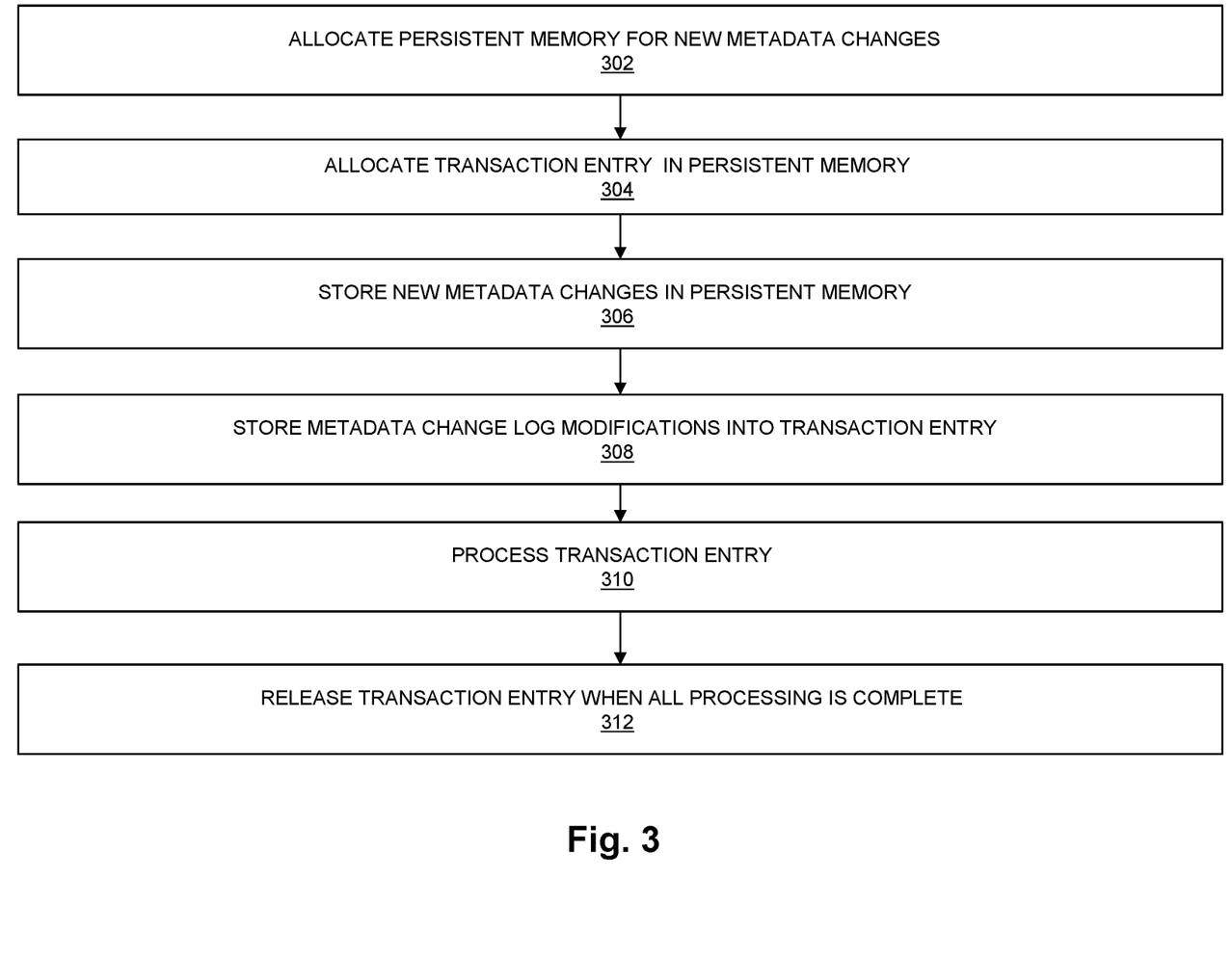
FIG. 3 is a flow chart showing an example of steps performed in some embodiments during metadata change management.

FIG. 3 is a flow chart showing an example of steps performed in some embodiments during metadata change management. At step 302, persistent memory is allocated to store a set of new metadata changes, e.g. within Metadata Change Log Memory Pool 145.

At step 304, a transaction entry is allocated within the persistent memory, e.g. within Transaction Entry Memory Pool 139.

At step 306, the set of new metadata changes is stored to the allocated persistent memory, e.g. by copying of New Metadata Changes 144 from Memory 126 to Persistent Memory 128.

At step 308, metadata change log modifications needed to add the new metadata changes to the metadata change log are stored into the transaction entry. For example, the Structural Modifications 204 are stored into Transaction Entry 200.

At step 310, the transaction entry is processed, e.g. by Metadata Change Update Logic 140. For example, processing of the transaction entry links the New Metadata Changes 144 to the Metadata Change Log 136.

At step 312, after the transaction entry has been completely processed, the transaction entry is released and can subsequently be used to add another set of new metadata changes to the metadata change log.

Figure 4:
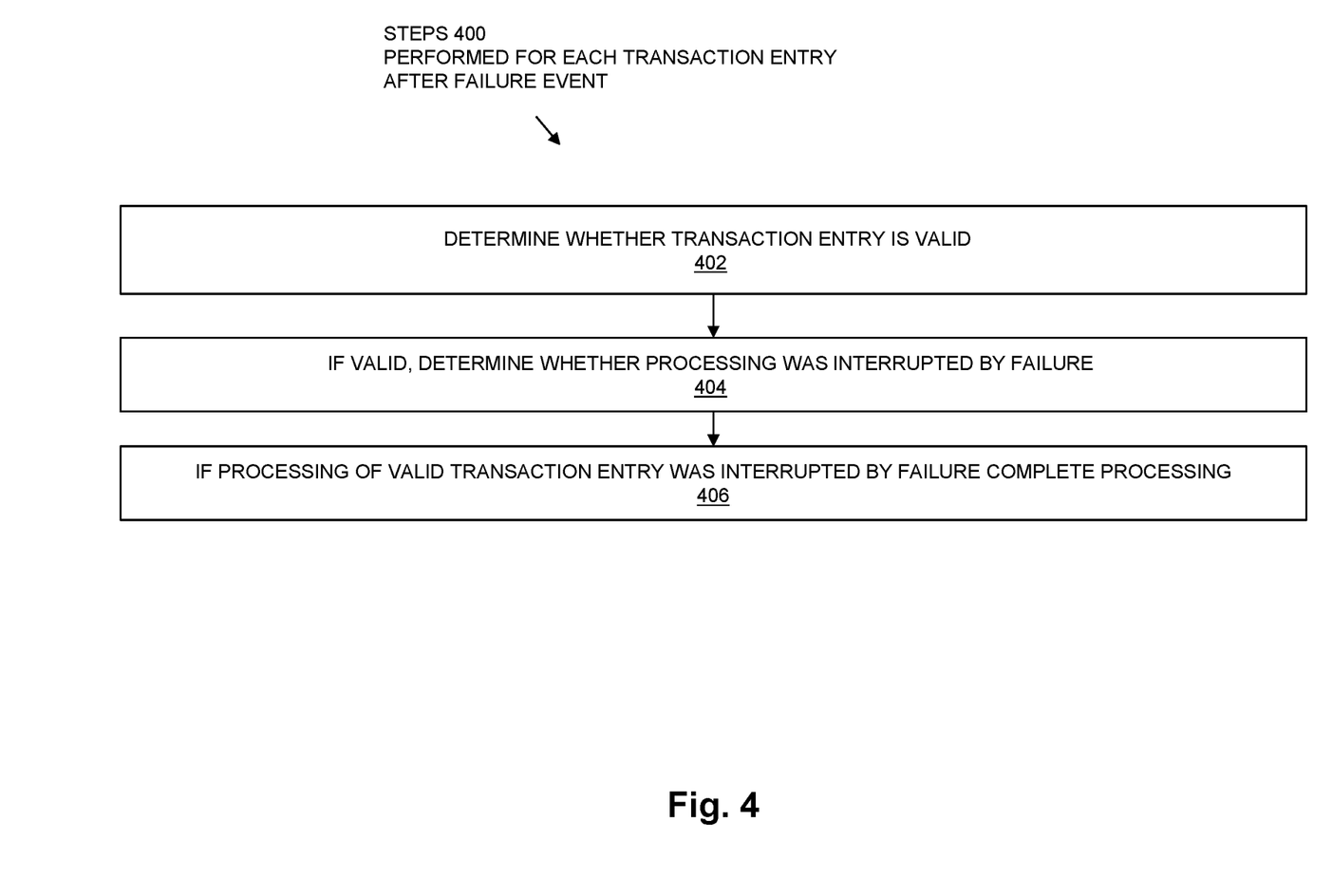
FIG. 4 is a flow chart showing an example of steps performed in some embodiments during failure recovery.

FIG. 4 is a flow chart showing an example of steps 400 that are performed in some embodiments during recovery from a failure event. The steps 400 are performed for each transaction entry in the transaction entry memory pool, e.g. by the Metadata Change Log Failure Recovery Logic 142.

At step 402, a determination is made as to whether the transaction entry is valid. For example, a checksum contained in the transaction entry may be checked to determine whether the transaction entry is valid.

If the transaction entry is determined to be valid at step 402, at step 404 a determination is made as to whether processing of the transaction entry was interrupted by the failure event. For example, pointers in the valid transaction entry may be compared to nodes of the metadata change log located at the corresponding offsets in the transaction entry. In the case of a mismatch (e.g. a node of the metadata change log located at one of the offsets currently still stores a null pointer), a determination is made that processing of the transaction entry was interrupted by the failure event.

At step 406, responsive to a determination that processing of the transaction entry was interrupted by the failure event, processing of the transaction entry is completed by replacing any null pointers that are located at offsets stored within the transaction entry with the pointers corresponding to the offsets in the transaction entry, i.e. with pointers indicating new metadata changes.

Figure 5:
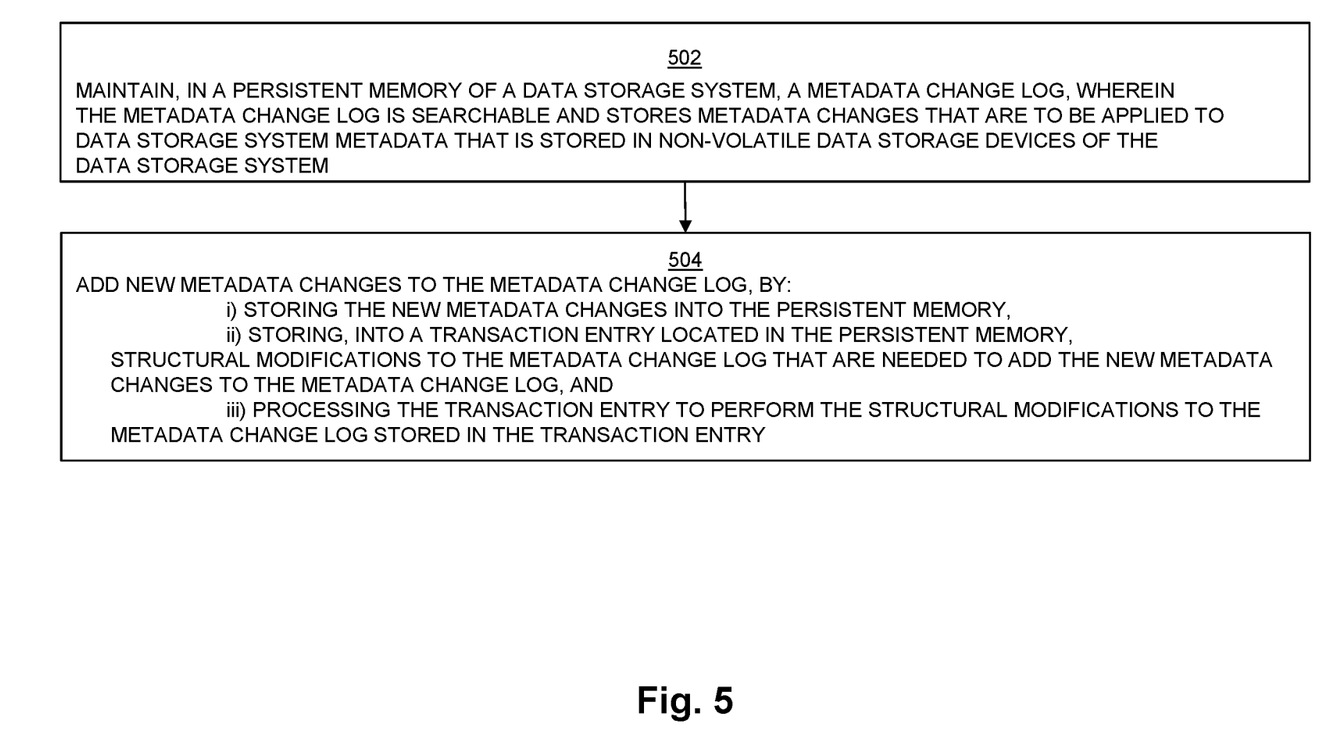
FIG. 5 is another flow chart showing an example of steps performed in some embodiments.

FIG. 5 is another flow chart showing an example of steps performed in some embodiments.

At step 502, a metadata change log is maintained in a persistent memory of a data storage system. The metadata change log is searchable and stores metadata changes that are to be applied to data storage system metadata that is stored in non-volatile data storage devices of the data storage system.

At step 504, new metadata changes are added to the metadata change log, by i) storing the new metadata changes into the persistent memory, ii) storing, into a transaction entry located in the persistent memory, structural modifications to the metadata change log that are needed to add the new metadata changes to the metadata change log, and iii) processing the transaction entry to perform the structural modifications to the metadata change log stored in the transaction entry.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
maintaining, in a persistent memory of a data storage system, a metadata change log, wherein the metadata change log is searchable and stores metadata changes that are to be applied to data storage system metadata that is stored in non-volatile data storage devices of the data storage system; and
adding a plurality of new metadata changes to the metadata change log, by:
storing the new metadata changes into the persistent memory within a memory pool for the metadata change log, wherein the memory pool for the metadata change log comprises a portion of the persistent memory from which the metadata change log is allocated, storing, into a transaction entry located in the persistent memory within a memory pool for transaction entries, a plurality of structural modifications to the metadata change log that are needed to add the new metadata changes to the metadata change log, by storing, for each one of the structural modifications, i) an offset of a null pointer within the memory pool for the metadata change log and ii) a pointer to a location of a respective one of the new metadata changes within the persistent memory, wherein the null pointer is replaced by the pointer to the location of the respective one of the new metadata changes when the transaction entry is processed, and wherein the memory pool for transaction entries comprises a portion of the persistent memory from which transaction entries are allocated that is separately located from the portion of the persistent memory from which the metadata change log is allocated, and processing the transaction entry to perform the structural modifications to the metadata change log stored in the transaction entry.

2. The method of claim 1, wherein the transaction entry is processed atomically, such that successful processing of the transaction entry is indicated only responsive to all structural modifications to the metadata change log that are stored in the transaction entry having been performed.

3. The method of claim 2, wherein the transaction entry is one of a plurality of transaction entries stored in the persistent memory; and wherein recovering from a failure event during which contents of volatile memory of the data storage system was lost includes, for each one of the plurality of transaction entries:

determining whether the transaction entry is valid;

in response to determining that the transaction entry is valid, determining whether processing of the transaction entry was interrupted by the failure event; and in response to determining that processing of the transaction entry was interrupted by the failure event, completing processing of the transaction entry.

4. The method of claim 1, wherein the persistent memory is battery backed to prevent loss of contents of the persistent memory during failure events that cause contents of a volatile memory of the data storage system to be lost.

5. The method of claim 1, wherein the persistent memory is located in a first storage processor of the data storage system; and wherein contents of the persistent memory is mirrored to another persistent memory located in a second storage processor of the data storage system.

6. The method of claim 1, wherein the non-volatile data storage devices of the data storage system comprise at least one solid state drive.

7. A data storage system comprising:
processing circuitry;
a memory;
a persistent memory;
a plurality of non-volatile data storage drives; and
wherein the memory has program code stored thereon, wherein the program code, when executed by the processing circuitry, causes the processing circuitry to:

maintain, in the persistent memory, a metadata change log, wherein the metadata change log is searchable and stores metadata changes that are to be applied to data storage system metadata that is stored in non-volatile data storage devices of the data storage system; and add a plurality of new metadata changes to the metadata change log, by causing the processing circuitry to:

store the new metadata changes into the persistent memory within a memory pool for the metadata change log, wherein the memory pool for the metadata change log comprises a portion of the persistent memory from which the metadata change log is allocated, store, into a transaction entry located in the persistent memory within a memory pool for transaction entries, a plurality of structural modifications to the metadata change log that are needed to add the new metadata changes to the metadata change log, by causing the processing circuitry to store, for each one of the structural modifications, i) an offset of a null pointer within the memory pool for the metadata change log and ii) a pointer to a location of a respective one of the new metadata changes within the persistent memory, wherein the null pointer is replaced by the pointer to the location of the respective one of the new metadata changes when the transaction entry is processed, and wherein the memory pool for transaction entries comprises a portion of the persistent memory from which transaction entries are allocated that is separately located from the portion of the persistent memory from which the metadata change log is allocated, and process the transaction entry to perform the structural modifications to the metadata change log stored in the transaction entry.

8. The data storage system of claim 7, wherein the transaction entry is processed atomically, such that successful processing of the transaction entry is indicated only responsive to all structural modifications to the metadata change log that are stored in the transaction entry having been performed.

9. The data storage system of claim 8, wherein the transaction entry is one of a plurality of transaction entries stored in the persistent memory; and wherein the program code further comprises program code that, when executed by the processing circuitry, causes the processing circuitry to recover from a failure event during which contents of volatile memory of the data storage system was lost at least in part by causing the processing circuitry to, for each one of the plurality of transaction entries:

determine whether the transaction entry is valid;

in response to a determination that the transaction entry is valid, determine whether processing of the transaction entry was interrupted by the failure event; and in response to a determination that processing of the transaction entry was interrupted by the failure event, complete processing of the transaction entry.

10. The data storage system of claim 7, wherein the persistent memory is battery backed to prevent loss of contents of the persistent memory during failure events that cause contents of the memory to be lost.

11. The data storage system of claim 7, wherein the persistent memory is located in a first storage processor of the data storage system; and wherein contents of the persistent memory is mirrored to another persistent memory located in a second storage processor of the data storage system.

12. The data storage system of claim 7, wherein the non-volatile data storage devices of the data storage system comprise at least one solid state drive.

13. A computer program product including a non-transitory computer readable medium having instructions stored thereon, wherein the instructions, when executed on processing circuitry, cause the processing circuitry to perform steps including:

maintaining, in a persistent memory of a data storage system, a metadata change log, wherein the metadata change log is searchable and stores metadata changes that are to be applied to data storage system metadata that is stored in non-volatile data storage devices of the data storage system; and adding a plurality of new metadata changes to the metadata change log, by:

storing the new metadata changes into the persistent memory within a memory pool for the metadata change log, wherein the memory pool for the metadata change log comprises a portion of the persistent memory from which the metadata change log is allocated, storing, into a transaction entry located in the persistent memory within a memory pool for transaction entries, a plurality of structural modifications to the metadata change log that are needed to add the new metadata changes to the metadata change log, by storing, for each one of the structural modifications, i) an offset of a null pointer within the memory pool for the metadata change log and ii) a pointer to a location of a respective one of the new metadata changes within the persistent memory, wherein the null pointer is replaced by the pointer to the location of the respective one of the new metadata changes when the transaction entry is processed, and wherein the memory pool for transaction entries comprises a portion of the persistent memory from which transaction entries are allocated that is separately located from the portion of the persistent memory from which the metadata change log is allocated, and processing the transaction entry to perform the structural modifications to the metadata change log stored in the transaction entry.

* * * * *